United States Patent [19]
Albach

[11] Patent Number: 4,821,166
[45] Date of Patent: Apr. 11, 1989

[54] POWER-SUPPLY CIRCUIT

[75] Inventor: Manfred Albach, Aachen, Fed. Rep. of Germany

[73] Assignee: U.S. Philips Corp., New York, N.Y.

[21] Appl. No.: 164,315

[22] Filed: Mar. 4, 1988

[30] Foreign Application Priority Data

Jul. 7, 1987 [DE] Fed. Rep. of Germany ....... 3722337

[51] Int. Cl.⁴ .......................................... H02M 5/453
[52] U.S. Cl. ........................................ 363/89; 363/44; 363/125; 323/282
[58] Field of Search ...................... 363/39, 44, 47, 48, 363/89, 125, 126; 323/282–290

[56] References Cited

U.S. PATENT DOCUMENTS 4,730,243  3/1988  Glennon .......................... 363/126 X

FOREIGN PATENT DOCUMENTS 2718598  10/1978  Fed. Rep. of Germany ........ 363/39
3025405   1/1982  Fed. Rep. of Germany ........ 363/44

OTHER PUBLICATIONS

"Schaltnetzteile in der Praxis", Kilgenstein, pp. 105–108.

*Primary Examiner*—Peter S. Wong
*Assistant Examiner*—Emanuel Todd Voeltz
*Attorney, Agent, or Firm*—Bernard Franzblau

[57] ABSTRACT

A power-supply circuit receives its power from an a.c. source (1) which, in specific time intervals is connected to a power-storage device (6) to feed power thereto. The power supply circuit includes a switch (10) which is periodically actuated by a control circuit (13) to take power from the power-storage device. Interference is suppressed in a simple, space-saving and cheap manner in that the control circuit (13) turns on the switch (10) only at times outside the time intervals (t2–t1) in which the a.c. source is connected to the power-storage device.

15 Claims, 3 Drawing Sheets

POWER-SUPPLY CIRCUIT

BACKGROUND OF THE INVENTION

This invention relates to a power-supply circuit comprising a power-storage means for storing the power supplied by an a.c. source in specific time intervals in which the alternating voltage source is connected to said power-storage means, comprising a switch for taking power from the power storage means, and comprising a control circuit for periodically actuating the switch.

The book "Schaltnetzteile in der Praxis" by Otmar Kilgenstein, Vogel Buchverlag, pages 105 ff. describes a forward converter for mains operation in which the mains voltage is rectified in a rectifier bridge and charges a storage capacitor. The storage capacitor is connected to the series arrangement of the primary winding of a transformer and a transistor, which transistor is alternately turned on and off by a control circuit. The power can be taken from the storage capacitor via a secondary winding of the transformer.

In the known circuit arrangement the switching operations of the periodically actuated switching transistor give rise to undesired high-frequency voltages and currents on the a.c. source, i.e. for example on the a.c. mains, which may give rise to interference in, for example, further loads powered by the alternating voltage source. In order to suppress such interference it is known to arrange passive high-frequency filters comprising coils, capacitors and, if required, resistors between the a.c. source and the other sections of the other circuit arrangement. Such an interference filter is mentioned in "Schaltnetzteile in der Praxis" in the caption to FIG. 5.1 on page 105. However, such filters are complex and expensive, and they also occupy a substantial part of the total circuit volume.

SUMMARY OF THE INVENTION

It is an object of the invention to improve a circuit arrangement of the type defined in the opening paragraph in such a way that the interference produced in such a circuit can be suppressed with simpler, less bulky and cheaper means.

This object is achieved in that the control circuit is adapted to actuate the switch only at times that fall outside the time interval in which the alternating voltage source is connected to the power storage means.

The invention is based on the recognition of the fact that the interference caused by the periodic actuation of the switch is transferred to the a.c. source only if said source is connected to the power-storage means for the purpose of supplying power to said means. According to the invention the actuation of the switch is inhibited in these time intervals, so that no interference is produced in these intervals. For the remainder of the time, in which the a.c. source is isolated from the power-storage means, the interference produced by the switch is kept at least substantially away from the a.c. source as a result of said isolation. This makes it possible to dispense with an interference filter of a conventional type.

Preferably, the a.c. source and the power-storage means are connected and disconnected from one another by a rectifier stage for feeding power from the a.c. source into the power-storage means. In the time intervals in which the rectifier stage is conductive to charge the powerstorage means the actuation of the switch is inhibited, so that no interference can be transferred from this switch to the a.c. source via the conductive rectifier stage.

Preferably the a.c. source is a power-supply mains. the invention then precludes the inrush of interference into said mains and thus prevents the interference from reaching other loads powered by said mains, such as for example electronic equipment for communication or data processing. however, the a.c. source may alternatively be a chopper circuit or the like, which is then protected against interference from subsequent circuitry by means of the invention.

For a further suppression of interference it may also be advantageous to shunt the recitifer stage with a capacitive arrangement. Such an arrangement enables interference across the rectifier stage to be short-circuited so that it cannot be transferred to the a.c. source and, moreover, it enables asymmetries in the reverse impedances of the rectifier stage to be compensated for and to preclude the parasitic transfer of interference caused by said asymmetries.

Further embodiments of the invention are described in the appended dependent claims.

BRIEF DESCRIPTION OF THE DRAWINGS

Some embodiments of the invention will now be described in more detail, by way of example, with reference to the accompanying drawings.

In the drawings

DESCRIPTION OF THE PREFERRED EMBODIMENTS

Figure 1:
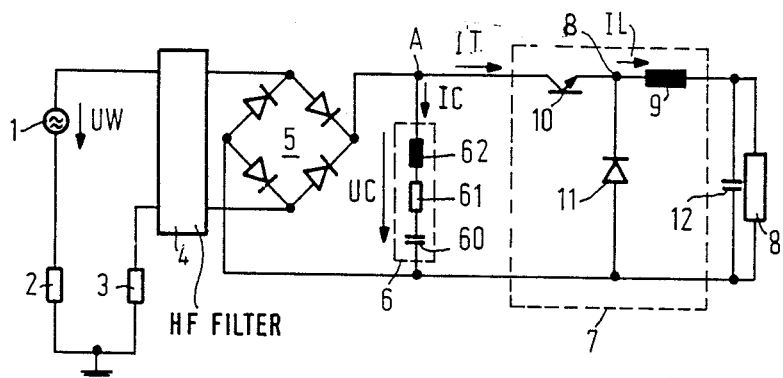
FIG. 1 shows a prior-art circuit arrangement.

FIG. 1 shows a prior-art circuit arrangement for supplying power from an a.c. source 1 to a load 8 via a powerstorage means 6. The a.c. source 1 is a power-supply mains whose line resistance is represented by two mains impedances 2, 3 in the equivalent diagram of FIG. 1. The alternating mains voltage UW is applied from the a.c. source 1 to a rectifier stage via a high-frequency filter 4, which functions as an interference filter. The rectifier stage comprises a four-diode bridge rectifier 5. The rectified alternating mains voltage charges the power-storage means 6. Said means suitably comprise an electrolytic capacitor whose H.F. equivalent diagram is shown in FIG. 1. In addition to the capacitor 60, it comprises a line resistance 61 and a line inductance 62. Instead of the electrolytic capacitor, the power-storage means 6 may comprise a storage batttery, which in the HF equivalent diagram of FIG. 1 takes the place of the capacitor 60.

The power-storage means 6 is connected to a switchedmode power supply 7 via which the load 8 is powered from the power-storage means 6. For this purpose the power supply 7 comprises a transistor 10, which serves as a periodically actuated switch, and a coil 9 arranged in series with the load 8. The series arrangement comprising the load 8, the coil 9 and the transistor 10 is connected in parallel with the power-storage means 6. Moreover, the series arrangement comprising the coil 9 and the load 8 is shunted by a freewheel diode 11, and a capacitor 12 is arranged in parallel with the load 8.

Figure 2:
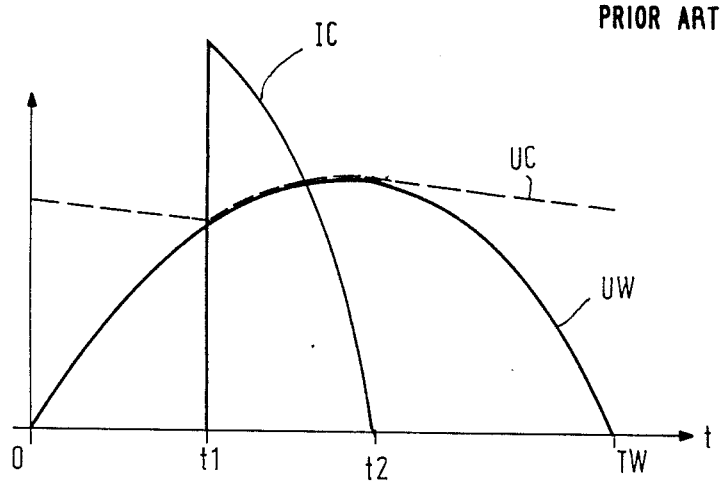
FIGS. 2 and 3 give voltage and current waveforms in the circuit arrangement of FIG. 1, FIGS. 4 and 6 show three embodiments of the invention, FIG. 7 gives signal waveforms in the circuit arrangement of FIG. 6, and FIGS. 8 and 9 show examples of modifications of the invention.

FIG. 2 shows current and voltage waveforms relating to the supply of power from the a.c. source 1 into the powerstorage means 6 for the time interval TW corresponding to one half-cycle of the alternating mains voltage UW. The time t is plotted on the horizontal axis. The broken line indicates the variation of the voltage UC across the powerstorage means 6. In the time interval from 0 to the instant t1 the voltage UC is higher than the alternating mains voltage UW. Consequently, the bridge rectifier 5 is cut off and no current flows from the alternating voltage source 1 into the power-storage means 6. Moreover, in said time interval the voltage UC decreases in conformity with the power consumed by the load 8. At the instant t1, at which the alternating mains voltage UW has increased to the value of the voltage UC across the power-storage means 6, the bridge rectifier 5 becomes conductive and a charging current IC is produced in the power-storage means 6. Its waveform is shown in FIG. 2. The voltage UC across the power-storage means 6 now follows the variation of the alternating mains voltage UW until this voltage has reached its peak value and decreases at a rate higher than that of the voltage UC which is dictated by the power taken by the switched-mode power supply 7. From this instant t2 the alternating mains voltage UW is again smaller than the voltage UC across the power-storage means 6 and the charging current IC becomes 0. Consequently, what has been stated for the time interval from 0 to t1 also applies to the time interval from t2 to TW.

Figure 3:
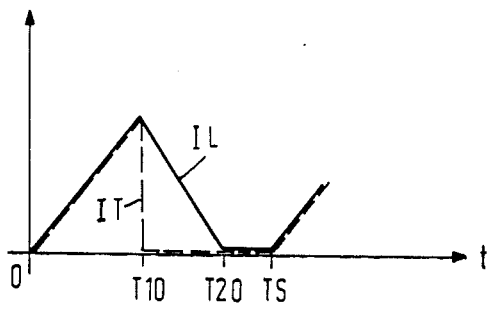

The operation of the switched-mode power supply 7 will now be described independently of the circuit sections described in the foregoing. For this purpose FIG. 3 shows two current waveforms. The transistor 10 is periodically turned on and off at a switching frequency which is high compared to the frequency of the alternating voltage UW. If the frequency of the alternating mains voltage UW is, for example, 50 Hz the transistor 10 is generally switched at a frequency of at least 20 kHz.

If the transistor 10 is turned on at the instant 0 a continuously increasing current IL will flow through the coil 9 and the load 8. This current is taken from the power storage means as a current IT via the transistor 10 and is produced by the voltage UC across this power-storage means. At the instant T10 the transistor 10 is cut off by the control circuit, not shown, so that the current IT becomes zero. However, as a result of the energy storage the current IL in the coil 9 is steady and therefore also flows after the instant T10, but now through the freewheel diode 11. It decreases steadily and becomes zero at the instant T20. At a subsequent instant TS, i.e. one period after actuation of the transistor 10 this transistor is turned on again and the currents IT and IL increase again. Both the powerstorage means 6 and the capacitor 12 are dimensioned in such a way, relative to the actuation period TS of the transistor 10, that the voltages across them do not noticeably follow the sawtooth-shaped currents IT and IL, so that the load 8 is always powered with a smoothed direct voltage. The currents IT and IL then act on substantially constant voltages and therefore exhibit at least substantially linear edges.

In the circuit arrangement of FIG. 1 the current IT through the transistor 10 via the junction point a is furnished only partly by the power-storage means 6 and for the remainder it is supplied directly by the a.c. source 1 via the rectifier bridge 5. This division depends on the impedance of the rectifier bridge 5, the mains impedances 2, 3 and the impedances of the power-storage means 6, i.e. in particular the line resistance 61 and the line inductance 62. The fraction of the current IT derived from the a.c. source 1 via the rectifier bridge 5 forms the interference to be suppressed by means of the invention. Allowance must then be made for the fact that on account of the line inductance the power-storage means 6, for example an electrolytic capacitor, will behave as a series tuned circuit whose impedance above the resonant frequency is dictated by the line inductance 62. This inductive reactance increases with the frequency so that an increasing fraction of the transistor current IT is supplied directly by the a.c. source 1 via the rectifier bridge 5. This means that in particular at high switching frequencies for the transistor 10, which are desirable in order to reduce the dimensions of the coil 9 and the capacitor 12, an increasing amount of interference is transferred to the a.c. source 1.

The amount of interference transmitted to the a.c. source 1 largely depends on the state of the rectifier bridge 5. In the time interval between t1 and t2 the rectifier bridge is conductive and together with the low mains impedances 2 and 3 it constitutes a low resistance via which a substantial portion of the transistor current IT flows. Typically, the mains impedances are smaller than or equal to 50 ohms at the frequency of the current IT.

In the other time intervals of the half-cycle of the alternating mains voltage UW the rectifier bridge 5 is cut off and thus constitutes a very high resistance, which in principle is dictated by the reverse capacitance of the rectifier bridge 5, for example, by the bridge diodes with their depletion-layer capacitances. These depletion-layer capacitances are of the order of magnitude of a few picofarads and constitute such a high resistance that substantially the entire transistor current IT is supplied by the power-storage means 6.

The invention utilizes the different behaviour of the circuit arrangement as described above and prevents interference from reaching the a.c. source 1 in that in the time intervals in which the rectifier bridge 5 is conductive the drive to the transistor 10 is interrupted and hence no interference can be produced. The high-frequency filter 4 may then be dispensed with. In the circuit arrangement shown in FIG. 1 this filter is replaced by a device for inhibiting the periodic drive of the transistor 10.

Figure 4:
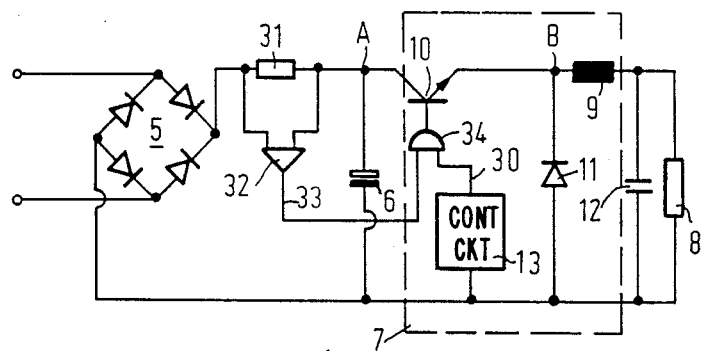

An example of such a circuit arrangement is shown in FIG. 4, in which the parts of the circuit described above bear the same reference numerals. In the switched-mode power supply 7 the control circuit 13 is also shown. This control circuit periodically turns on the transistor 10 and for this purpose it is connected to the base of this transistor via a line 30. A measurement resistor 31 of low resistance is arranged in the connection between the rectifier bridge 5 and the junction point A and across this resistor a small voltage drop is produced when the charging current IC flows in the time interval t1 to t2. The resistance value of the measurement resistor 31 is dimensioned in such a way that the voltage drop produced by the charging current IC can be detected reliably by a following measurement amplifier 32, but produces only a minimal loss of power. On its output 33 the measurement amplifier 32 produces a digital inhibit signal, which assumes the logic value 0 when the charging current IC flows and which has the logic value 1 in the other time intervals. As a result of this, an AND circuit 34 arranged in the line to the transistor 10 is opened and the transistor 10 is turned off in the time interval between t1 and t2.

Figure 5:
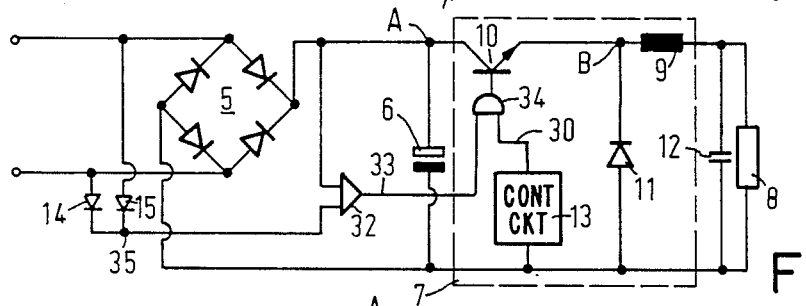

Instead of the charging current IC the difference between the alternating voltage UW and the voltage UC across the power-storage means 6 can be measured to derive an inhibit signal. In this way it is possible to avoid the losses in the measurement resistor. FIG. 5 shows such a circuit arrangement in which the elements already described bear the same reference numerals. In this circuit arrangement a series arrangement comprising two oppositely poled diodes 14, 15 is connected to the a.c. source 1, in parallel with the rectifier bridge 5, so that the rectified non-smoothed alternating mains voltage, i.e. a waveform as represented by UW in FIG. 2, appears at the junction point 35 between said diodes. In the measurement amplifier 32 this voltage is compared with the voltage UC across the power-storage means 6. The inhibit signal appearing on its output 33 assumes the same values as described for the circuit arrangement of FIG. 4.

Figure 6:
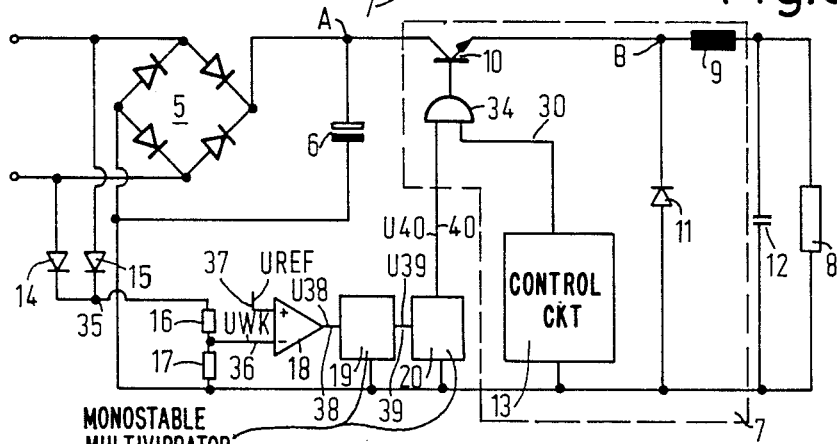
Figure 6:
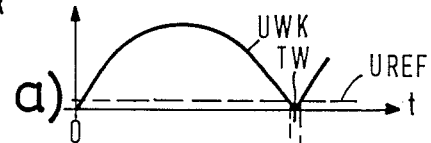

FIG. 6 shows a third embodiment comprising a time-gate circuit. This circuit comprises a comparator 18 and two monostable multivibrators 19 and 20. Identical parts bear the same reference numerals as in the arrangements described above. In the circuit arrangement shown in FIG. 6 the rectified non-smoothed alternating mains voltage UW is applied from the junction point 35 between the diodes 14, 15 to a first input 36 of the comparator 18 via a voltage divider comprising two resistors 16, 17, a reference voltage UREF is applied to the second input 37. Preferably, the comparator 18 comprises a differential amplifier whose inverting input is the first input 36 and whose non-inverting input is the second input 37 of the comparator 18.

Figure 7:
Figure 7:
Figure 7:
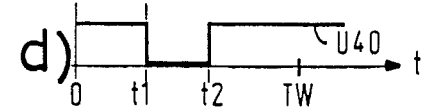

FIG. 7 shows some signal waveforms relating to the arrangement of FIG. 6. FIG. 7a shows the voltage UWK obtained on the first input 36 of the comparator 18 after rectification by means of the diodes 14 and 15 and subsequent division in the voltage divider 16, 17. The reference voltage UREF is represented as a broken line. This reference voltage is low relative to the amplitude of the voltage UWK, so that, for the greater part of the period TW of one half-cyle of the alternating main voltage, UWK is higher than the reference voltage UREF. The voltage UWK becomes smaller than the value of the voltage UREF only in the direct proximity of the zero crossings of the alternating mains voltage UW, i.e. for example near the instant 0 and the instant TW. In these small time intervals the voltage U38 on the output 38 of the comparator 18 assumes a high value, whereas it is zero in the other time intervals. FIG. 7b shows the voltage U38 as a function of time.

The voltage U38 on the output 38 of the comparator 18 is applied to an input of the first monostable multivibrator 19. This multivibrator further comprises an output 39, on which a voltage U39 appears, whose variation is shown in FIG. 7c. Each rising edge of the voltage U38 produces a positive voltage pulse on the output 39 of the first monostable 19, which pulse terminates a time interval t1 after the beginning of the half-cycle of the alternating mains voltage UW during which the pulse in the voltage U38 is produced. The pulses of the voltage U39 are applied to an input of the second monostable multivibrator 20, which input is connected to the output 39 of the first monostable 19. The falling edges of the voltage U39 produce negative voltage pulses of a length t2-t1 on the output 40 of the second monostable 20. These pulses are shown as the waveform U40 in FIG. 7d. They define a time gate which corresponds exactly to the time interval in which the charging current IC flows. The voltage U40 is applied to the AND-circuit 34 via the output 40 and during said time gate it inhibits the drive of the transistor 10 via the line 30. In order to compensate for fluctuations in the position and length of the time interval in which the charging current IC flows, caused by tolerances or variations of the load 8, the time gate may be slightly larger than the time interval between t1 and t2.

Figure 8:
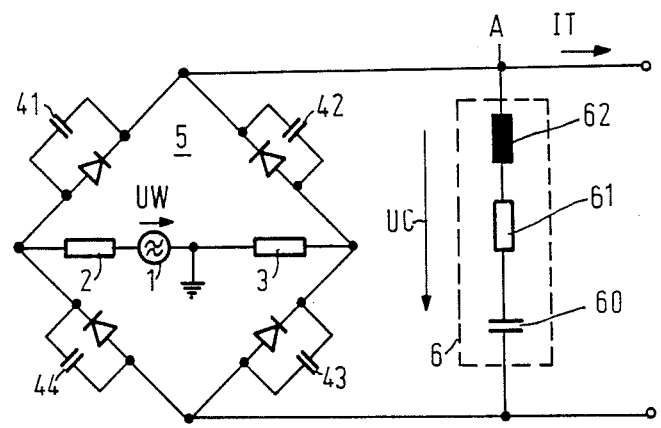

FIG. 8 shows an example of a further embodiment of the invention, which enables interference produced across the a.c. source 1 by the transistor 10 to be reduced even further. In the circuit arrangement in accordance with the invention interference across the rectifier bridge 5 caused by the current IT occurs only in those time intervals in which the diodes of the rectifier bridge 5 are cut off. The depletion-layer capacitances of the diodes are then operative. They constitute a bridge arrangement in whose diagonal arm the series arrangement of the voltage source 1 and the mains impedances 2, 3 is situated. If the values of the depletion-layer capacitances of all the diodes are identical, the bridge is balanced and no interference can reach the a.c. source 1. However, the depletion-layer capacitances of the diodes depend strongly on the voltages across these diodes. However, these voltages change constantly as a result of the alternating mains voltage UW, so that even in the case of identical diodes balancing is achieved only during the zero crossings of the alternating mains voltage UW. In the circuit arrangement shown in FIG. 8 the diodes of the rectifier bridge 5 are therefore shunted by a capacitive arrangement comprising four trimming capacitors 41, 42, 43, 44 which are each arranged in parallel with interference ones of the diodes of the rectifier bridge 5. The trimming capacitors 41, 42, 43, 44 have large capacitances in comparison with the maximum depletion-layer capacitances of the diodes that can be reached by driving said diodes with the alternating mains voltage UW. In fact, the balance of the rectifier bridge 5 depends on the trimming capacitors 41, 42, 43, 44 and is then largely independent of the alternating mains voltage UW applied to the rectifier bridge 5. In this way the transfer of interference to the a.c. source by the current IT is reduced even further.

Although the above steps relate to and have been described for the reduction of symmetrical interference appearing in phase opposition on both mains lines and hence in both mains impedances 2, 3, the invention also reduces asymmetrical interference. Such interference occurs, for example, if the potential after the transistor 10, i.e. at the junction point B between the transistor 10, the coil 9 and the freewheel diode 11, is switched between a low value near ground potential and a high value near the voltage UC as a result of the transistor 10 and the freewheel diode 11 being turned on and turned off alternately. Since parasitic capacitances between the junction point B and the ground lines cannot be avoided completely, capacitive currents will flow which are in phase and which are in principle distributed equally between the two mains impedances 2, 3 in FIG. 1. In the equivalent diagram of FIG. 9 this is illustrated diagrammatically by means of the current IS and the parasitic capacitance 21. This diagram, in which elements corresponding to those in the preceding Figures bear again the same reference numerals, shows that the parasitic current IS is divided between the two branches constituted by the mains impedances 2 and 3 and flows back to point B via the rectifier bridge 5, point A and the transistor 10. For a typical value of the parasitic capacitance 21 smaller than 100 pF, the depletion-layer capacitances of the diodes of the rectifier bridge 5 and, if present, the trimming capacitors 41, 42, 43, 44 do not constitute a sufficiently high impedance for an effective suppression of the current IS, and the low resistance values of the mains impedances 2, 3 of 50 ohms or smaller are not suitable at all for this. Therefore, the shunt capacitors 22, 23 are arranged in parallel with the arrangement comprising the a.c. source 1, the mains impedances 2, 3 and the rectifier bridge 5, said capacitors being dimensioned in such a way that for the current IS they present a substantially lower impedance than the cut-off rectifier bridge 5. This enables such interference components to be suppressed very effectively with simple means, i.e. with capacitors of comparatively low capacitance values.

Figure 9:
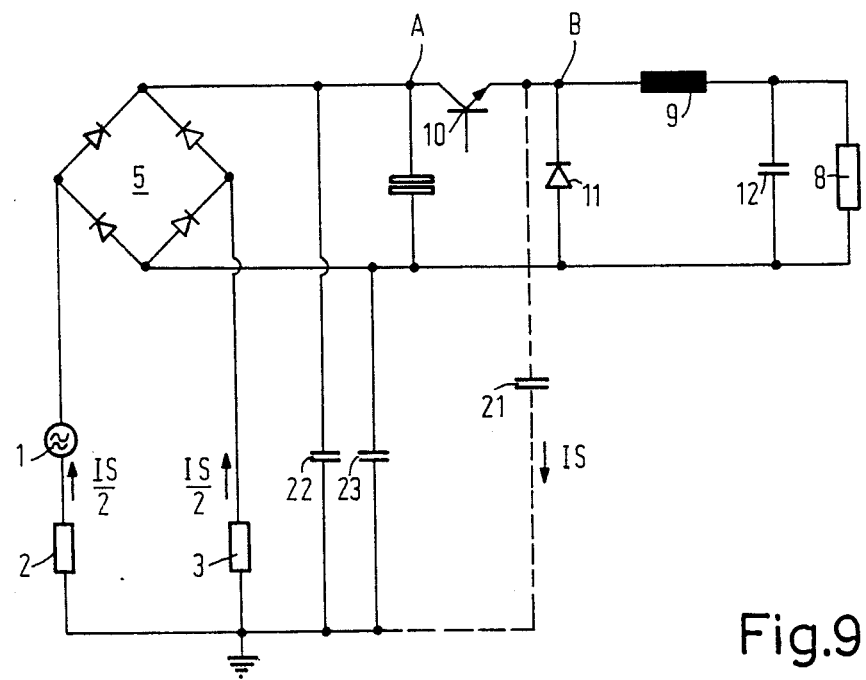

Altogether the invention enables a very simple and compact construction to be obtained, even if both the shunt capacitors 22, 23 in FIG. 9 and the trimming capacitors 41, 42, 43 44 in FIG. 8 are used. The advantage of a simplified arrangement is also maintained if, in accordance with the invention, the power supply to the load 8 is inhibited during the time intervals in which the charging current IC flows and the capacitor 12 must therefore be dimensioned accordingly. It is particularly favourable if the capacitor 12 is replaced by a storage battery arranged in parallel with the load, which enables the charging intervals to be chosen more freely.

What is claimed is:

1. A power-supply circuit comprising: a power-storage means for storing power supplied by an a.c. voltage source, means for periodically connecting said power storage means to said a.c. voltage source during specific time intervals in order to feed power to said power storage means, switch means for taking power from the power storage means, and a control circuit for periodically actuating the switch means such that the control circuit actuates the switch means only outside said specific time intervals in which the a.c. voltage source is connected to the power-storage means.

2. A power supply circuit as claimed in claim 1, wherein said connecting means comprise a rectifier stage.

3. A power supply circuit as claimed in claim 1, characterized in that the a.c. voltage source is a power-supply mains.

4. A power-supply circuit as claimed in claim 1, further comprising a detector for detecting said time intervals in which the a.c. voltage source is connected to the power-storage means and for inhibiting actuation of the switch means during said intervals.

5. A power-supply circuit as claimed in claim 4, wherein the detector is constructed as a current detector for detecting a change current from the a.c. voltage source into the power-storage means.

6. A power-supply circuit as claimed in claim 4, wherein the detector comprises a voltage detector for detecting a voltage difference of a specific polarity and/or magnitude between the a.c. voltage source and the power-storage means.

7. A power-supply circuit as claimed in claim 1, further comprising a time-gate circuit for inhibiting actuation of the switch means under control of the a.c. voltage source in time gates comprising said specific time intervals in which power is fed into the power-storage means.

8. A power-supply circuit as claimed in claim 2, characterized in that the entire rectifier stage is shunted by a capacitive arrangement.

9. A power-supply circuit as claimed in claim 2 wherein the rectifier stage is shunted by a capacitive arrangement comprising a capacitor circuit which connects those terminals of the rectifier stage which are connected to the power-storage means to a ground terminal of the a.c. voltage source.

10. A power-supply circuit as claimed in claim 2, characterized in that the rectifier stage comprises a rectifier bridge and comprises trimming capacitors individually connected in parallel with elements of the rectifier bridge and of which have a capacitance value substantially higher than the depletion-layer capacitance of its parallel element.

11. A power-supply circuit as claimed in claim 2, further comprising a detector for detecting said specific time intervals in which the a.c. voltage source is connected to the power-storage means and for inhibiting actuation of the switch means during said intervals.

12. A power-supply circuit as claimed in claim 11, wherein the detector comprises a current detector for detecting a charge current from the a.c. voltage source into the power-storage means.

13. A power-supply circuit as claimed in claim 11, wherein the detector comprises a voltage detector for detecting a voltage difference of a specific polarity and/or magnitude between the a.c. voltage source and the power-storage means.

14. A power-supply circuit as claimed in claim 2, further comprising a time-gate circuit for inhibiting actuation of the switch means under control of the a.c. voltage source in time gates comprising said specific time intervals in which power is fed into the power-storage means.

15. A power-supply circuit as claimed in claim 11 further comprising a capacitive arrangement connected in shunt with the entire rectifier stage.

* * * * *